United States Patent
Lefurgy et al.

(10) Patent No.: US 9,021,473 B2
(45) Date of Patent: *Apr. 28, 2015

(54) HARDWARE CHARACTERIZATION IN VIRTUAL ENVIRONMENTS

(75) Inventors: Charles Robert Lefurgy, Austin, TX (US); Karthick Rajamani, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 968 days.

This patent is subject to a terminal disclaimer.

(21) Appl. No.: 13/046,966

(22) Filed: Mar. 14, 2011

(65) Prior Publication Data

US 2012/0240109 A1  Sep. 20, 2012

(51) Int. Cl.
*G06F 9/455* (2006.01)
*G06F 11/34* (2006.01)

(52) U.S. Cl.
CPC ........ *G06F 11/3409* (2013.01); *G06F 11/3428* (2013.01); *G06F 2201/815* (2013.01)

(58) Field of Classification Search
CPC combination set(s) only.
See application file for complete search history.

(56) References Cited

U.S. PATENT DOCUMENTS

| | | | |
|---|---|---|---|
| 7,665,005 B2 | 2/2010 | Szydlowski | |
| 2007/0283009 A1* | 12/2007 | Takemura | 709/224 |
| 2009/0119542 A1 | 5/2009 | Nagashima et al. | |
| 2009/0210873 A1* | 8/2009 | Cuomo et al. | 718/1 |
| 2009/0327656 A1 | 12/2009 | Baum et al. | |
| 2010/0011233 A1 | 1/2010 | Halepete et al. | |
| 2011/0004878 A1 | 1/2011 | Divoux | |
| 2011/0022356 A1 | 1/2011 | Nussbaum et al. | |

FOREIGN PATENT DOCUMENTS

CN         101710301 B       5/2010

* cited by examiner

*Primary Examiner* — Eric C Wai
(74) *Attorney, Agent, or Firm* — Garg Law Firm, PLLC; Rakesh Garg; William J. Stock

(57) ABSTRACT

A, system, and computer program product for hardware characterization in a virtual environment are provided in the illustrative embodiments. The hardware resource is allocated to a test virtual machine (VM). A characterization workload is configured to execute in the test VM to characterize a parameter of the hardware resource. The characterization workload is caused to execute on the test VM. A first result of the characterization workload execution is received from the test VM, wherein the result assigns a value to a characteristic of the hardware resource indicative of a behavior of the hardware resource under a set of circumstances.

9 Claims, 6 Drawing Sheets

FIG. 2
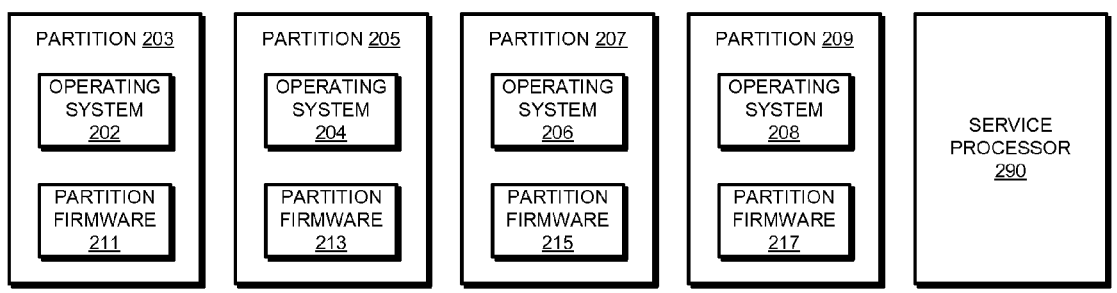
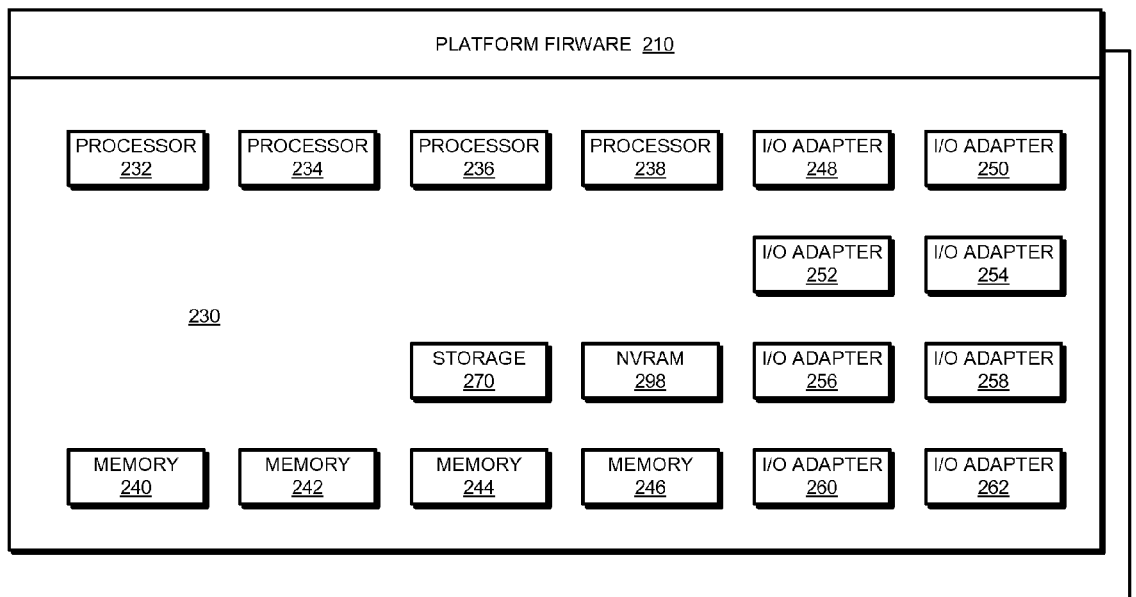
LOGICAL PARTITIONED
PLATFORM
200

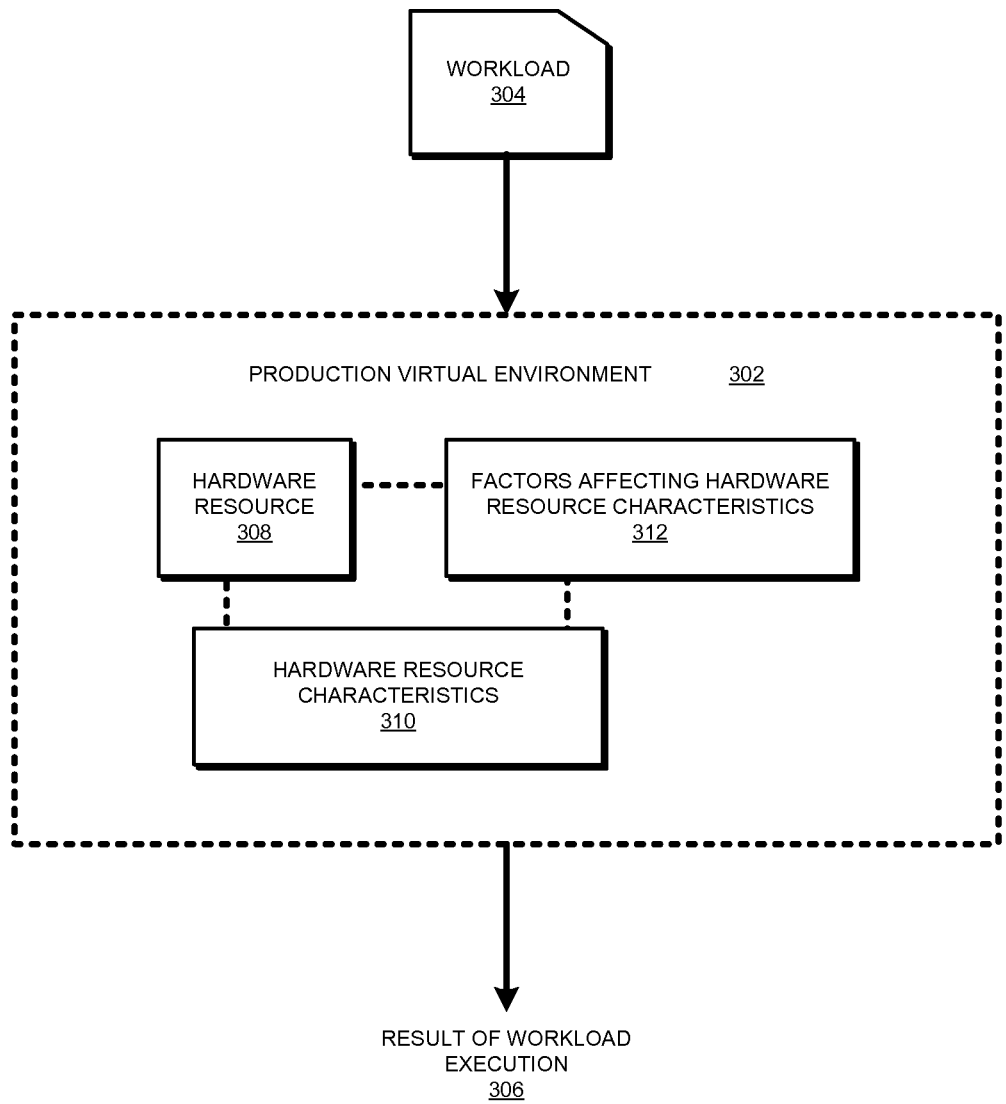
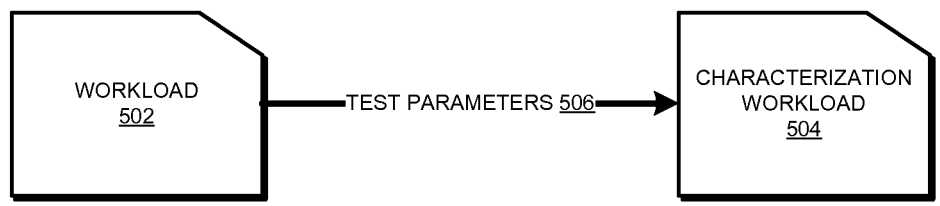

HARDWARE CHARACTERIZATION IN VIRTUAL ENVIRONMENTS

RELATED APPLICATION

The present invention is related to similar subject matter of and commonly assigned U.S. patent application Ser. No. 13/024,941 entitled "DYNAMIC POWER AND PERFORMANCE CALIBRATION OF DATA PROCESSING SYSTEMS," filed on Feb. 10, 2011, which is hereby incorporated by reference.

BACKGROUND

1. Technical Field

The present invention relates generally to a system, and computer program product for efficiently operating a data processing system in a data processing environment. More particularly, the present invention relates to a system, and computer program product for characterizing hardware resources in a virtual data processing environment.

2. Description of the Related Art

Data processing systems, such as server computers, are typically manufactured according to prescribed specifications. Once manufactured and tested, the data processing systems may then be deployed in a variety of configurations and circumstances.

Similarly configured data processing systems may be modified over time. For example, over time, different data processing systems of comparable specification may be reconfigured with new or different hardware, software, or both. A data processing system's performance, power consumption, and failure points are functions of the data processing system's configuration, components, and circumstances.

Furthermore, even seemingly identical electronic components, such as semiconductor devices, have differing characteristics. For example, channel widths, doping, and conductor insulation, exposure focus, and other similar aspects of a semiconductor device can vary slightly from one device to another even on the same wafer. Additionally, once installed and operational, the electrical properties of the semiconductor devices can vary over a period of use. For example, insulating layers can break down or begin to leak due to the heat produced in operation.

SUMMARY

The illustrative embodiments provide a system, and computer program product for hardware characterization in virtual data processing environments. An embodiment allocates the hardware resource to a test virtual machine (VM). The embodiment configures a characterization workload to execute in the test VM to characterize a parameter of the hardware resource. The embodiment causes the characterization workload to execute on the test VM. The embodiment receives a first result of the characterization workload execution from the test VM, wherein the result assigns a value to a characteristic of the hardware resource indicative of a behavior of the hardware resource under a set of circumstances.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts a block diagram of an example logical partitioned platform in which the illustrative embodiments may be implemented;

FIG. 3 depicts a block diagram of a virtual data processing environment that can be improved using an illustrative embodiment;

FIG. 5 depicts a block diagram of an example creation of a characterization workload usable in a test VM in accordance with an illustrative embodiment;

DETAILED DESCRIPTION

Figure 1:
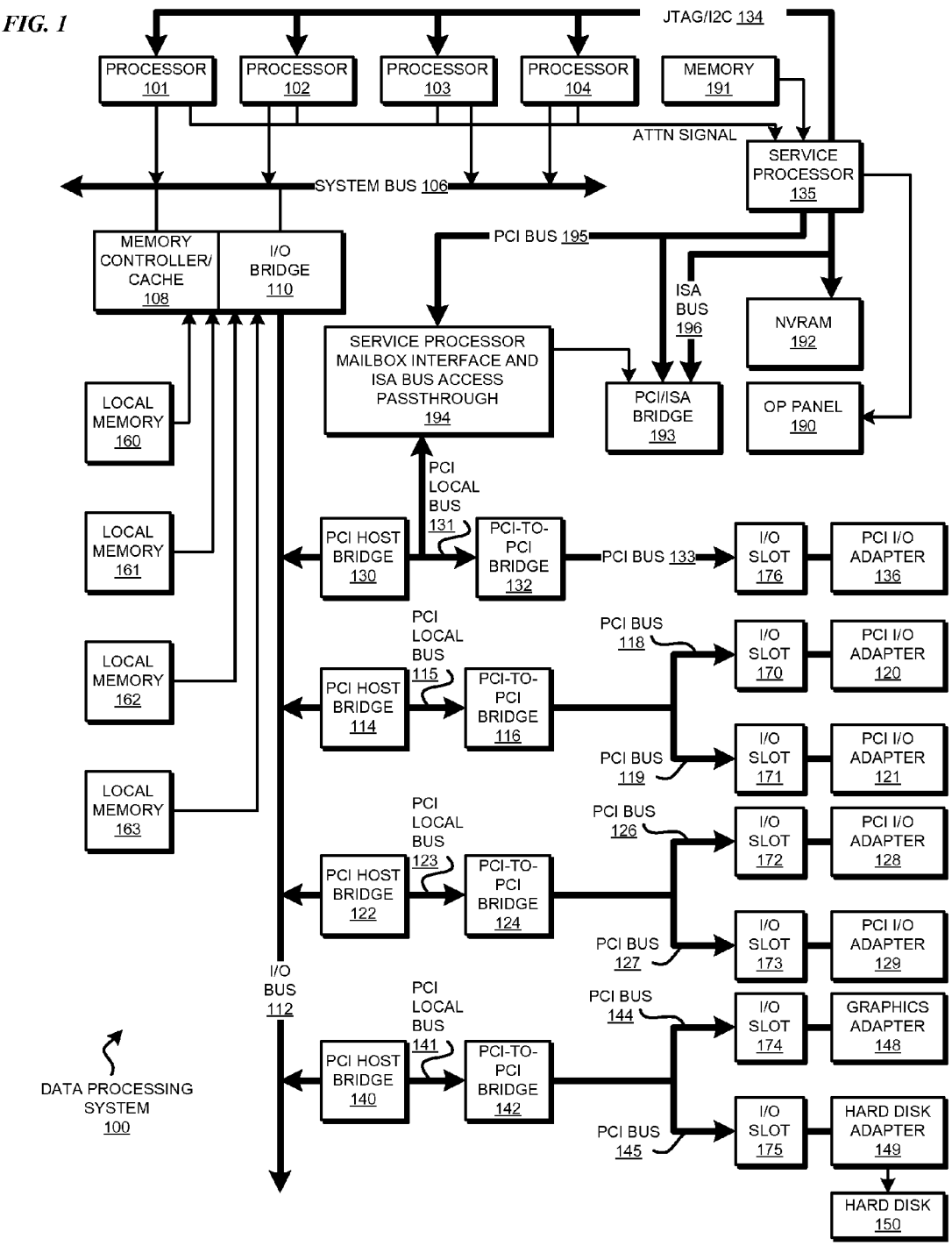
FIG. 1 depicts a block diagram of a data processing system in which the illustrative embodiments may be implemented is depicted.

A data processing system (system) consumes electrical power to perform system operations. The nature of operations performed, time consumed to perform those operations, heat produced in performing those operations, and components activated for performing those operations are some example of a system's characteristics.

A system can have many other characteristics that can be attributed to individual hardware components or to a group thereof, collectively referred to as hardware resources. In other words, a hardware resource, comprising one or more hardware component in a system, can exhibit certain characteristics that are indicative of how the system will perform under certain circumstances, when subjected to certain workloads, or a combination thereof. Measuring these characteristics, or characterizing them, is useful at least because these measurements may enable selection of suitable systems for given workloads, and vice versa.

Some examples of these system characteristics that can be characterized are energy efficiency of a hardware resource, total cost of performing a set of operations (e.g., time, energy, and computing resource consumption), points and/or circumstances of system failure. Characterization of hardware resources in various combinations in a given system can produce data that can be used for planning and scheduling tasks on the system, and for excluding those tasks that can cause certain hardware resources of the system to exhibit undesirable values of certain characteristics.

A system according to the invention includes virtually configured systems that are created by assigning a set of hardware resources to operate together as a virtual machine (VM), e.g., a partition in a host data processing system. The invention recognizes that characterization of hardware resources may be needed when the environment of the system changes. For example, characterization or re-characterization of a virtual system's hardware resources may be needed when the ambient temperature of the host system, on which the virtual system is executing, changes. As another example, re-characterization of a virtual system's hardware resources may be needed when the host system receives a new hot-pluggable hardware component, or a hot-pluggable component is removed from the host system.

As another example, re-characterization of a virtual system's hardware resources may be needed when the host system has been in operation for a period of time, and the hardware components of the host system have aged. As another example, re-characterization of a virtual system's hardware resources may be needed when the virtual system is going to be subjected to a new workload. Characterization of hardware resources may of course be explicitly requested, such as by an in-band partition or a management software or hardware.

Furthermore, the objective of the characterization may be to determine a hardware component's efficiency, a limit or threshold on a hardware resource's parameter, for determining desirable values of those parameters, or for determining workload characteristics that cause those desirable values. The above circumstances are only examples and the need to characterize or re-characterize a virtual system's hardware resources may arise in many more circumstances as will be apparent from this disclosure to those of ordinary skill in the art.

The invention recognizes that characterization of hardware resources itself consumes computing resources. Accordingly, characterizing a hardware resource in an operational system, such as a production virtual machine or partition (production VM), adversely affects the performance of that operational system. Characterization of hardware resources by prior art techniques may even require that the operational system be shutdown, so that the hardware characterization may be performed.

The illustrative embodiments used to describe the invention generally address and solve the above-described problems and other problems related to characterization of hardware resources in virtual data processing environments. The illustrative embodiments provide a system, and computer program product for hardware characterization in virtual environments.

According to an embodiment of the invention, the hardware resources of a virtual system can be characterized under certain circumstances, at certain events, during certain times, and in conjunction with certain operations (dynamically). Furthermore, an embodiment allows such characterization without causing a production VM to suffer a shutdown or performance loss.

Hardware characterization according to an embodiment of the invention allow systems management components, such as a Hypervisor, to make decisions about how to set the system or systems in a configuration, to meet specific operational objectives.

An embodiment can also allow a closed-loop systems management scheme, whereby a characterization results in a calibration of hardware resources, and the calibration triggers a re-characterization, either continuously, periodically, or based on events. Furthermore, an embodiment can facilitate a priori configuration of a system for a future workload based on the hardware characterization for the system.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses. However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logical partitioned platform in which the illustrative embodiments may be implemented. The hardware in logical partitioned platform 200 may be implemented as, for example, data processing system 100 in FIG. 1.

Logical partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using IBM-i, which are designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

With reference to FIG. 3, this figure depicts a block diagram of a virtual data processing environment that can be improved using an illustrative embodiment. System 302 may be a virtual environment, such as partition 203 in FIG. 2, which may be in use as a production system. Workload 304, executed on system 302 produces result 306.

System 302 includes one or more hardware resource 308. Hardware resource 308 may include one or more distinct hardware or firmware components allocated to system 302, such as by a Hypervisor. Hardware resource 308 inherently has hardware resource characteristics 310, examples of which are described above. Characteristics 310 may be characterized using an embodiment of the invention described herein.

Factors 312 affecting hardware resource characteristics 310 may be ambient, inherent, age-related, time-related, workload-related, configuration-related aspects, or any other similar aspects of the operational environment of system 302. Some examples of factors 312 are described above.

Result 306 may be the actual or expected performance of system 302 for the execution of workload 304, which may be improved by manipulating the configuration of system 302 using the characterization performed using an embodiment. Under certain circumstances, result 306 may also be a system failure resulting from the execution of workload 304, which may be avoidable by manipulating the configuration of system 302 using the characterization performed using an embodiment.

Figure 4:
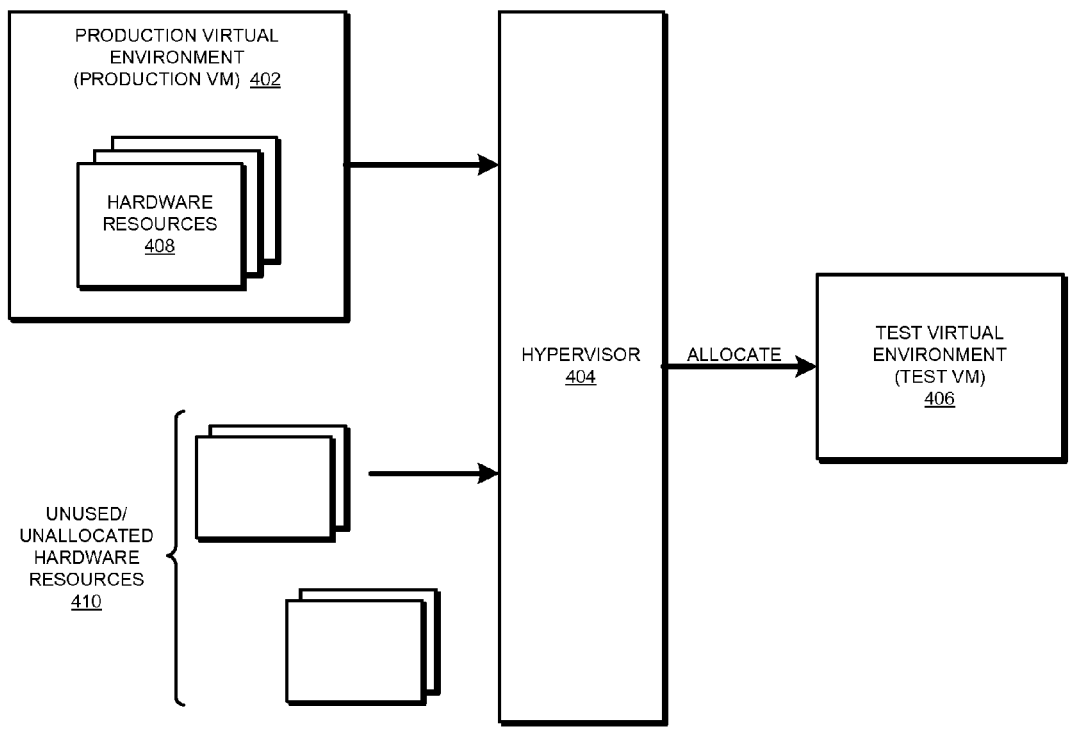
FIG. 4 depicts a block diagram of a virtual system configuration for hardware characterization in accordance with an illustrative embodiment.

With reference to FIG. 4, this figure depicts a block diagram of a virtual system configuration for hardware characterization in accordance with an illustrative embodiment. System 402 may be a production virtual environment, or production VM, similar to system 302 in FIG. 3. Hypervisor 404 may be any virtual environment monitoring/enabling component of a given virtual data processing environment.

Test virtual environment (test VM) 406 is a virtual machine created for the purpose of performing hardware characterization. Test VM 406 may be created at boot time or as needed during the operation of production VM 402 or other VMs on a host system. Note that test VM 406 is distinct from production VM 402 even though both may exist on the same host system.

As a first scenario, assume that hardware resources 408 of production VM 402 include a hardware resource that has to be characterized. Hypervisor 404 temporarily assigns that hardware resource 408 from production VM 402 to test VM 406. Test VM 406 executes a characterization test on that hardware resource 408 and returns the characterization results to hypervisor 404. Hypervisor 404 may de-allocate the previously assigned resource 408 and assign a different resource 408 to test VM 406, to characterize as many resources 408 as needed.

The host system, where production VM 402 and test VM 406 may be executing, may include unused or unallocated hardware resources 410. It may be desirable to characterize or re-characterize the hardware resources of the host system from time to time. Having the characteristics of the host system's hardware resources available at hypervisor 404 may be advantageous in associating workloads with appropriate production VMs, or in configuring production VM 402 with those hardware resources that have favorable characteristics for certain workloads.

Therefore, as an alternate scenario, hypervisor 404 may allocate one or more resources from unused/unallocated hardware resources 410 to test VM 406. Test VM 406 may execute a suitable characterization test on that hardware resource 410 and return the characterization results to hypervisor 404. Hypervisor 404 may de-allocate the previously assigned resource 410 and assign a different resource 410 to test VM 406, to characterize as many resources 410 as needed.

Generally, a characterization test may be executed on test VM 406 as and when desired. For example, a test may be executed when a new hot pluggable device is added or removed from the host system. As another example, a test may be executed when the ambient environment of the host system has changed, such as when a fan speed or ambient temperature changes. A test may be modeled based on these and many other system and environmental factors without limitation.

Furthermore, the test may be executed automatically upon detecting an event, or upon an explicit request. Additionally, tests may be scheduled for execution when host system's utilization is below a threshold, a certain times, or in conjunction with certain activities in production VM 402.

With reference to FIG. 5, this figure depicts a block diagram of an example creation of a characterization workload usable in a test VM in accordance with an illustrative embodiment. Workload 502 may be similar to workload 304 in FIG. 3. Characterization workload 504 may include a characterization test as described with respect to test VM 406 in FIG. 4.

In certain circumstances, it may be desirable to predetermine the characteristics of hardware resources in a given production VM as they may affect the execution of workload 502. Particularly, certain aspects of workload 502 may cause a hardware resource to underperform a threshold performance criterion, fail, or cause the failure of the production VM as a whole. For example, in one embodiment workload 502 may be computation intensive, stressing the processor and processor socket beyond a threshold temperature limit. In another example embodiment, workload 502 may be I/O intensive, stressing the I/O controller, memory module, and/or hard disk drive to experience delays, heating, or both.

In cases where these and other aspects of workload 502 can be identified which are expected to affect certain characteristics of certain hardware resources, those aspects can be extracted or derived from workload 502 in the form of test parameters 506. Test parameters 506, for example, may represent a level of computational or I/O load as in workload 502.

Example test parameters 506 are described only for illustration purposes and are not intended to be limiting on the invention. Many test parameters based on workload 502 will be apparent from this disclosure to those of ordinary skill in the art and the same are contemplated within the scope of the invention. As an example, in some instances, all or part of actual workload 502 may be included in characterization workload 504 where test parameters 506 are either inherent in workload 502 or not conveniently extractable there from.

Figure 6:
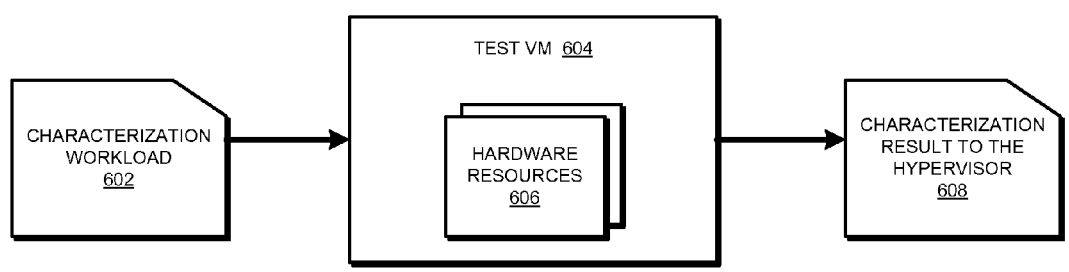
FIG. 6 depicts a block diagram of an example process of characterization in accordance with an illustrative embodiment.

With reference to FIG. 6, this figure depicts a block diagram of an example process of characterization in accordance with an illustrative embodiment. Characterization workload 602 may be similar to characterization workload 504 in FIG. 5. Test VM 604 may be similar to test VM 406 in FIG. 4. Hardware resource 606 in test VM 604 may be one or more of hardware resources 408 or 410 in FIG. 4.

Test VM 604 executes characterization workload 602 for measuring designated parameters of hardware resource 606, that is, characterizing hardware resource 606 under (i) the system conditions and environmental conditions of the host system of test VM 604, and (ii) the test parameters incorporated in characterization workload 602. Test VM 604 returns characterization result 608 to the hypervisor, such as hypervisor 404 in FIG. 4.

Test VM 604 may also release hardware resource 606 upon completion of characterization workload. Released hardware resource 606 may be returned to a production VM, such as when hardware resource 606 was one of hardware resources 408 in FIG. 4, or returned to the unallocated resource pool, such as when hardware resource 606 was one of resources 410 in FIG. 4.

Figure 7:
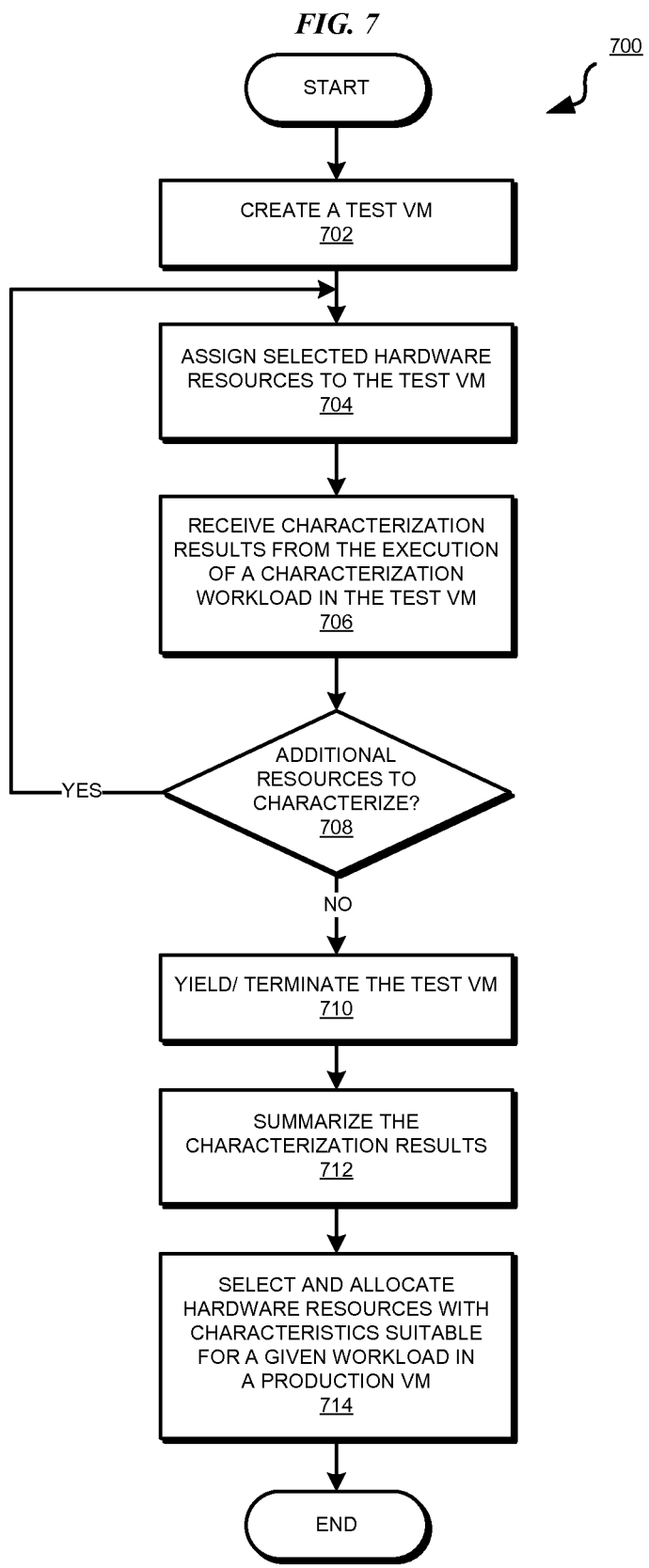
FIG. 7 depicts a flowchart of an example process of hardware characterization in a virtual data processing environment in accordance with an illustrative embodiment.

With reference to FIG. 7, this figure depicts a flowchart of an example process of hardware characterization in a virtual data processing environment in accordance with an illustrative embodiment. Process 700 may be implemented in a hypervisor, such as hypervisor 404 in FIG. 4.

Process 700 begins by creating a test VM, such as test VM 604 in FIG. 6 (step 702). Process 700 assigns selected hardware resource(s) to the test VM (step 704). Process 700 receives the characterization results from the execution of a characterization workload on the test VM (step 706).

Process 700 determines whether additional resources have to be characterized (step 708). If additional resources have to be characterized ("Yes" path of step 708), process 700 returns to step 704 and assigns a different selected hardware resource to the test VM.

If no more resources have to characterized ("No" path of step 708), process 700 may optionally yield or terminate the test VM (step 710). Process 700 may summarize the results of one or more characterization in any suitable manner (step 712).

As an optional step, process 700 may then select and allocate hardware resources with characteristics suitable for a given workload in a production VM (step 714). Process 700 ends thereafter. In one embodiment, step 714 may not be included in process 700 and may be a part of a different process.

The summarization of step 712 is explained by way of examples for clarity. For example, microprocessors have significant variation in power consumption even on identical workloads and depending on run-time factors such as node ambient temperature or fan speed. If the selected hardware resource in step 704 is one of the processors, and process 700 characterizes each processor by following the "Yes" path of step 708 in this manner, eventually, process 700 will receive similar characterization information of all the processors in the node (host system).

Based on the characterization information on the processors, process 700 can perform an "energy-efficiency sort" in which the processors are sorted in the order of their energy efficiency. In other words, process 700 can summarize the characterization information on various processors such that selection of a processor based on the processor's energy efficiency under certain given conditions is made possible by process 700. For example, a scheduling algorithm can use the most efficient processor and turn off the less efficient ones in response to changing utilization of the host system.

Furthermore, the characterization can be performed periodically to account for the changing system configuration and environmental factors. For example, a processor that was the most energy-efficient under one set of circumstances may not be the most energy-efficient under a different set of circumstances. Thus, if the processors are characterized periodically under changing circumstances, process 700 can update the summary of step 712 such that the scheduling algorithm can select the correct processor based on the circumstances at any given time.

As another example, a test VM can be configured to test a hardware resource for optimal operating conditions or a failure point under a given set of circumstances. For example, one resource may not cause a failure under a given workload whereas another similar resource may cause a failure. As another example, one resource may perform more desirably than another similar resource under a given workload and ambient conditions. Again, if the characterization data in available on the same resource for different operating conditions, or on different resources for similar operating conditions, or a combination thereof, process 700 can facilitate the selection of the most suitable resource from a pool of resources based on the given circumstances.

As another example, process 700 can assist in dynamic placement or migration of VMs by pre-characterization of the impact on the performance of the VM in a new host system or environment. For example, process 700 can initiate test VM execution on all candidate host systems. For the hardware resources required by a production VM that is to be migrated, process 700 can characterize those hardware resources on the various candidate host systems. In addition, process 700 can also summarize how the power consumption will change post-migration on those host systems. Process 700 can then facilitate the selection of the most suitable host system to which the production VM should be migrated.

Figure 8:
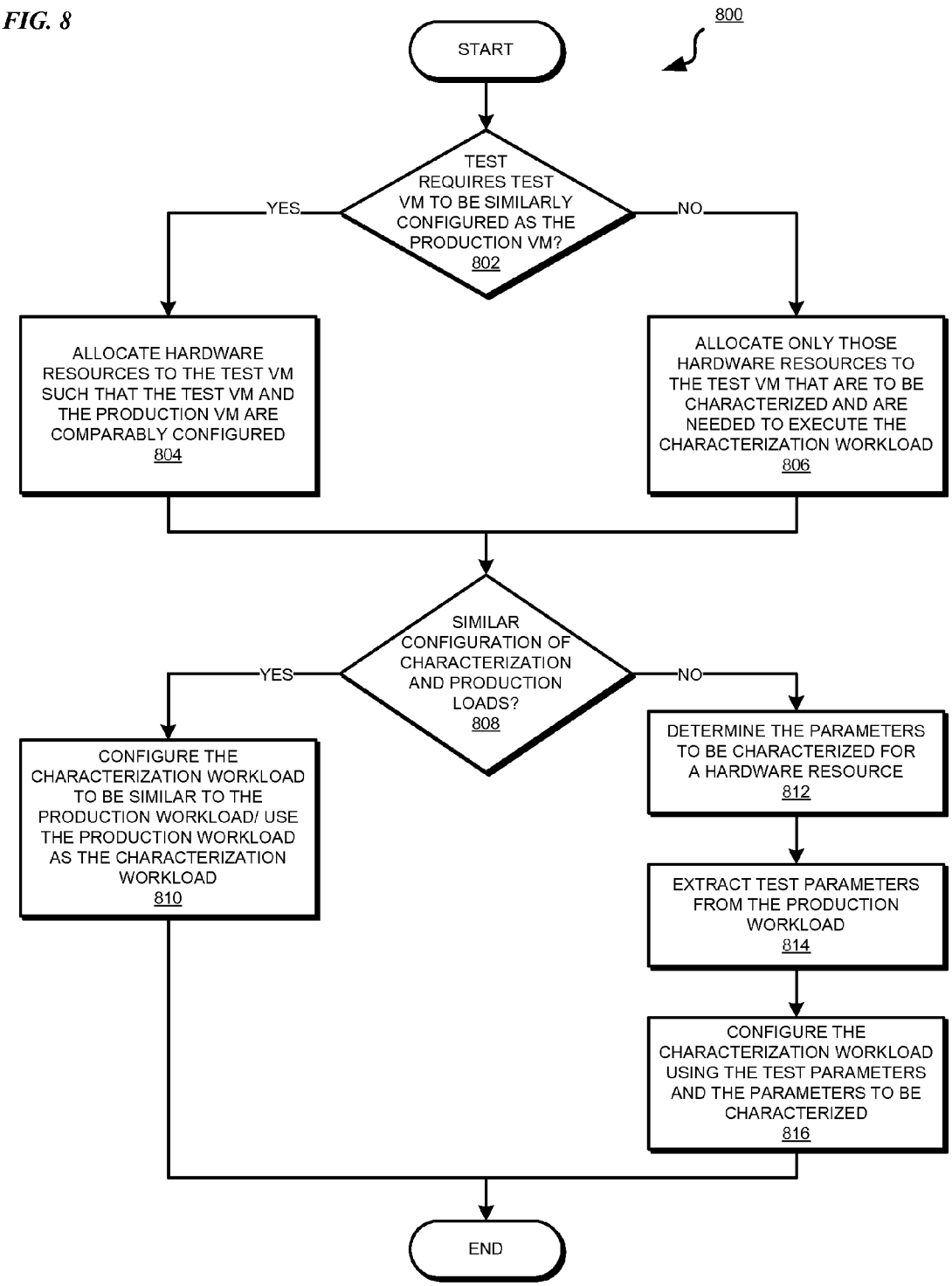
FIG. 8 depicts a flowchart of an example process of creating a test VM and characterization workload in accordance with an illustrative embodiment.

With reference to FIG. 8, this figure depicts a flowchart of an example process of creating a test VM and characterization workload in accordance with an illustrative embodiment. Process 800 can be implemented in a hypervisor, such as hypervisor 404 in FIG. 4. Alternatively, process 800 can be implemented in a software application that may be executed in any physical or virtual system.

Process 800 begins by determining whether a particular characterization exercise (test) requires the test VM to be similarly configured as a given production VM (step 802). If the test VM has to be configured similar to the production VM ("Yes" path of step 802), process 800 allocates hardware resources to the test VM such that the test VM and the production VM are comparably configured (step 804). The allocation of step 804 is in addition to the allocation of the hardware resource that is to be characterized using the test VM.

If the test VM need not be configured similar to the production VM ("No" path of step 802), process 800 allocates only those hardware resources to the test VM that are to be characterized and those that are needed to execute the characterization workload (step 806). Process 800 then determines whether the objective of characterization is the detection of a failure point of the hardware resource when subjected to the production workload (step 808). If the configuration of the characterization workload and the production workload has to be similar for some reason, such as in some but not all configurations for the detection of a failure point ("Yes" step of step 808), process 800 may configure the characterization workload to be similar, comparable, or even identical to the production workload (step 810). Process 800 ends thereafter.

If the objective is not the detection of a failure point ("No" path of step 808), process 800 determines the parameters of the hardware resource that are to be characterized (step 812). Process 800 extracts the test parameters from the production workload (step 814). Process 800 configures the characterization workload using the test parameters of the production workload and the parameters of the hardware resource to be characterized (step 816). Process 800 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a system, and computer program product are provided in the illustrative embodiments for hardware characterization in virtual environments. Using an embodiment of the invention, not only failure or margin testing but any type of hardware characterization can be performed. For example, hardware resources can be characterized for comparing relative energy-efficiencies, performance metrics, or any other parameter of the hardware resources.

Furthermore, an embodiment is applicable to any type of hardware resource that can be assigned to a virtual machine. The embodiments utilize the hypervisor for coordinating and summarizing the characterization results across hardware resources of similar or diverse nature without limitation. The test parameters can be chosen by the hypervisor or an external hardware or software entity, such as by examining the production workload, host system's configuration and ambient environment, or a combination of these and several other factors.

An embodiment may also be configured to simulate or otherwise introduce certain faults or defects in a hardware resource such that the characterization is inclusive of that fault or defect. Furthermore, the fault or defect may be in a resource or component other than the hardware resource being characterized such that the characterization is inclusive of the effect of the fault or defect on the hardware resource's characteristic.

An embodiment is usable dynamically when hot-pluggable components are added or removed from the host system. An embodiment is also usable dynamically as the operating environment, including but not limited to the ambient environment, of the host system changes.

An embodiment may allow any number of test VMs to be executed concurrently or sequentially to characterize same or different characteristics of various hardware resources. Furthermore, an embodiment may allow comparing different characteristics of hardware resources with one another. For example, similar but not identical hardware resources may have differently represented characteristics that may be comparable to one another using an embodiment.

An embodiment may also include other methods or variations of running the characterization with a characterization workload. For example, an embodiment may step through a set of parameter values for a workload in test VM without using any production VM. As another example, an embodiment may step through different non-workload related parameter values using the test VM. Parameter values may include different hardware states, or any other resource property, such as a size of a memory.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device" and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer usable program product comprising a computer usable storage device including computer usable code for characterizing a hardware resource in a virtual data processing environment, the computer usable code comprising:
    computer usable code for creating a test virtual machine (VM) in a host system, the test virtual machine (VM) for performing the characterizing of the hardware resource;
    computer usable code for allocating the hardware resource to the test virtual machine (VM) in the host system, wherein the hardware resource is temporarily assigned from a production VM in the host system to the test VM in the host system, wherein the hardware resource was selected in the production VM under a first operating circumstance and the allocating being responsive to a change in the first operating circumstance to a second operating circumstance;
    computer usable code for configuring a characterization workload to execute in the test VM to characterize a parameter of the hardware resource;
    computer usable code for causing the characterization workload to execute on the test VM;
    computer usable code for receiving a first result of the characterization workload execution from the test VM, wherein the result assigns a value to a characteristic of the hardware resource indicative of a behavior of the hardware resource under the second operating circumstance; and
    computer usable code for configuring, responsive to the value of the characteristic of the hardware resource being below a threshold associated with the second operating circumstance, the production VM with a second hardware resource in place of the hardware resource.

2. The computer usable program product of claim 1, further comprising:
    computer usable code for performing the allocating, the configuring, and the causing, for the second hardware resource;
    computer usable code for receiving a second result from the test VM, wherein the second result assigns a second value to a second characteristic of the second hardware resource indicative of a behavior of the second hardware resource under the second operating circumstance; and
    computer usable code for summarizing the first and the second results, such that more suitable of the hardware resource and the second hardware resource can be selected for allocation to a production VM.

3. The computer usable program product of claim 2, wherein the receiving the second result occurs from a second test VM, and wherein the second characteristic is the characteristic of the second hardware resource.

4. The computer usable program product of claim 1, wherein the hardware resource is being used by a production VM.

5. The computer usable program product of claim 1, wherein the hardware resource is an unallocated hardware resource.

6. The computer usable program product of claim 1,
    wherein the characterization workload is configured based on a set of test parameters, the test parameters having been extracted from a production workload which is to be executed on a production VM, the hardware resource being allocated to the production VM.

7. The computer usable program product of claim 1, wherein the computer usable code is stored in a computer readable storage medium in a data processing system, and wherein the computer usable code is transferred over a network from a remote data processing system.

8. The computer usable program product of claim 1, wherein the computer usable code is stored in a computer readable storage medium in a server data processing system, and wherein the computer usable code is downloaded over a network to a remote data processing system for use in a computer readable storage medium associated with the remote data processing system.

9. A data processing system for characterizing a hardware resource in a virtual data processing environment, the data processing system comprising:
    a storage device, wherein the storage device stores computer usable program code; and
    a processor, wherein the processor executes the computer usable program code, and wherein the computer usable program code comprises:
    computer usable code for creating a test virtual machine (VM) in a host system, the test virtual machine (VM) for performing the characterizing of the hardware resource;
    computer usable code for allocating the hardware resource to the test virtual machine (VM) in the host system, wherein the hardware resource is temporarily assigned from a production VM in the host system to the test VM in the host system, wherein the hardware resource was selected in the production VM under a first operating circumstance and the allocating being responsive to a change in the first operating circumstance to a second operating circumstance;
    computer usable code for configuring a characterization workload to execute in the test VM to characterize a parameter of the hardware resource;
    computer usable code for causing the characterization workload to execute on the test VM;
    computer usable code for receiving a first result of the characterization workload execution from the test VM, wherein the result assigns a value to a characteristic of the hardware resource indicative of a behavior of the hardware resource under the second operating circumstance; and
    computer usable code for configuring, responsive to the value of the characteristic of the hardware resource being below a threshold associated with the second operating circumstance, the production VM with a second hardware resource in place of the hardware resource.

* * * * *